United States Patent [19]

Posti et al.

[11] Patent Number: 4,597,088
[45] Date of Patent: Jun. 24, 1986

[54] EQUALIZER FOR THE CORRECTION OF DIGITAL SIGNALS WITH COMPENSATION OF PRECURSOR AND POSTCURSOR INTERFERENCES

[75] Inventors: Enzo Posti; Giovanni Tamburelli, both of Turin, Italy

[73] Assignee: CSELT - Centro Studi e Laboratori Telecomunicazioni S.p.A., Turin, Italy

[21] Appl. No.: 607,206

[22] Filed: May 4, 1984

[30] Foreign Application Priority Data

May 5, 1983 [IT] Italy .................. 67485 A/83

[51] Int. Cl.[4] .......................................... H03H 7/30
[52] U.S. Cl. ........................... 375/12; 333/18; 364/724
[58] Field of Search .............. 375/12, 13, 14, 15, 375/16; 333/18; 364/724; 178/69 R

[56] References Cited

U.S. PATENT DOCUMENTS

| 4,034,196 | 7/1977 | Butterweck et al. | 375/14 |
| 4,170,758 | 10/1979 | Tamburelli | 375/12 |
| 4,288,872 | 9/1981 | Tamburelli | 375/14 |
| 4,306,307 | 12/1981 | Levy et al. | 375/15 |

Primary Examiner—Robert L. Griffin
Assistant Examiner—Stephen Chin
Attorney, Agent, or Firm—Herbert Dubno; Karl F. Ross

[57] ABSTRACT

An equalizer with two parallel branches for precursor and postcursor correction, receiving periodically incoming binary pulse samples, generates for each sample two purged symbols f, b at the outputs of these branches along with two decided symbols f and b, all of which are transmitted to a logic network checking whether or not the two decided symbols are identical. In the event of a disparity, the network produces an estimated signal s, calculates the absolute differences $d_{sf}$, $d_{sb}$ between signals s and f, b, supplements them with further signals $d_f$, $d_b$ representing the contributions of postcursors and precursors from one or more preceding and following samples, and compares resulting discriminatory signals $D_f$ and $D_b$ to determine which of the two decided symbols should be emitted as an output signal of the equalizer.

10 Claims, 2 Drawing Figures

EQUALIZER FOR THE CORRECTION OF DIGITAL SIGNALS WITH COMPENSATION OF PRECURSOR AND POSTCURSOR INTERFERENCES

FIELD OF THE INVENTION

Our present invention relates to an equalizer for the correction of digital signals with suppression of precursor and postcursor distortion by means of feed-forward and feedback circuit branches, and to a method of operating same.

BACKGROUND OF THE INVENTION

An equalizer of the type here considered is the subject matter of commonly owned U.S. Pat. No. 4,288,872 in the name of one of us, Giovanni Tamburelli. As disclosed in that patent, the equalizer comprises two parallel branches inserted between a source of incoming pulse samples, representing binary symbols received with a predetermined recurrence period, and a decision unit. The first branch has an upstream filter for the linear suppression of postcursor effects, followed by a nonlinear compensation cell of feed-forward type purging the incoming symbols from precursor interference. Analogously, an upstream filter in the second branch linearly suppresses precursor effects and is followed by a nonlinear compensation cell of feedback type designed to eliminate postcursor interferences.

The operation of that equalizer is based on the presumption that decision errors are unlikely to occur simultaneously in both branches; the summing of the output signals of these branches reduces possible distortions due to the occurrence of one such error.

Although the system of the prior patent generally performs satisfactorily, there is still the risk that consecutive decision errors in one branch may falsify the final output signal.

OBJECT OF THE INVENTION

Thus, the object of our present invention is to provide an improved equalizer of the type discussed in which the probability of an erroneous overall decision is further decreased.

SUMMARY OF THE INVENTION

We realize this object, in accordance with our present invention, by connecting the downstream end of each equalizer branch to a respective decision unit and supplying a decided symbol generated by that unit, together with a purged but undecided signal or symbol bypassing same, to a logic network wherein the decided symbols of the two branches are continuously compared for the detection of a possible disparity in any period. In the absence of such disparity, the logic network emits one of the two mutually identical decided symbols as the output signal of the equalizer. If, however, a disparity is found to exist, an arithmetic unit is activated and linearly combines the two undecided symbols, multiplied by respective coefficients, into an estimated signal which is then subtracted from the decided but mutually unequal symbols of the two branches to provide a first and a second difference signal. A calculator connected to the first branch, activated concurrently with the arithmetic unit, receives delayed undecided and decided symbols of that branch from one or more recurrence periods immediately preceding the first period in which a disparity has been detected; this first calculator sums the absolute values of the differences between decided and undecided symbols in all these preceding recurrence periods and supplies that sum as a first supplemental signal to a first cumulative adder also receiving the first difference signal, thereby producing a first discriminatory signal taking into account the contribution of the postcursors of one or more preceding symbols to the decision error evidenced by the aforementioned disparity. When identity between the decided symbols of the two branches has been re-established in a subsequent recurrence period, another calculator connected to the second branch is activated during one or more immediately following recurrence periods and receives the decided and undecided symbols of that branch to determine their absolute differences for each of these following periods, supplying them as a second supplemental signal to a second cumulative adder which also receives the second difference signal to generate a second discriminatory signal taking account of the contribution of the precursors of one or more subsequent symbols to the decision error. The two critical signals are then compared with each other and, depending on their relative magnitudes, the decided symbol from one or the other branch (i.e. the one producing the lesser discriminatory signal) is emitted at the network output; in the event of equality of the two discriminatory signals, either one of these decided symbols may be so selected. In a limiting instance, the two calculators need only take the symbols of one preceding and one subsequent recurrence period into account.

BRIEF DESCRIPTION OF THE DRAWING

The above and other features of the invention will now be described in detail with reference to the accompanying drawing in which.

SPECIFIC DESCRIPTION

Figure 1:
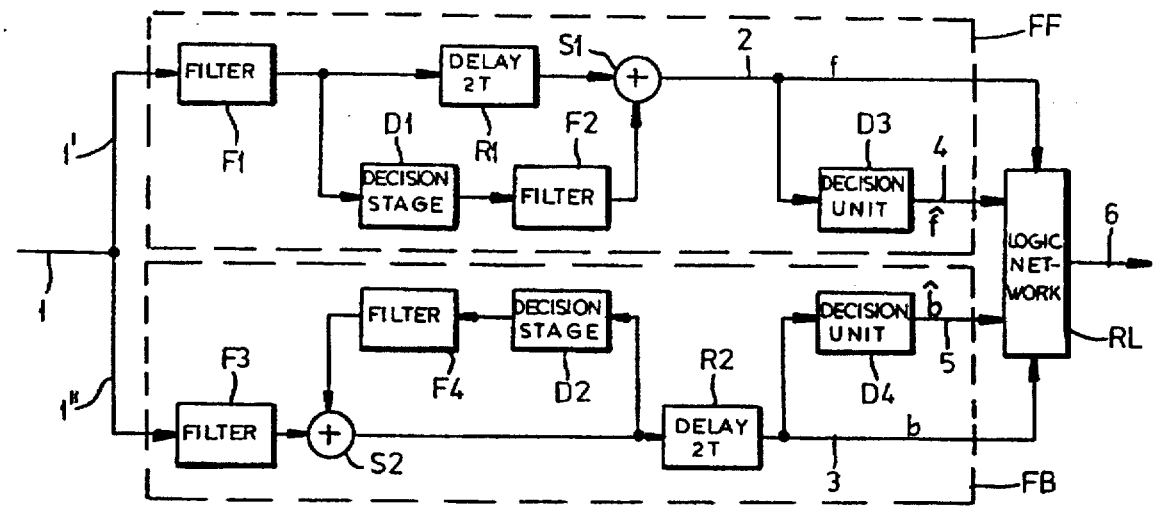
FIG. 1 is a block diagram of an equalizer, generally corresponding to that of the above-identified Tamburelli patent, embodying our present improvement.

In FIG. 1 we have shown a transmission line 1 on which incoming symbols in the form of signal pulses periodically appear with a recurrence period T. Extensions 1' and 1" of line 1 respectively enter a feed-forward branch FF and a feedback branch FB of an equalizer for the correction of precursor and postcursor distortion, these extensions terminating at respective input filters F1 and F3 which are preferably of the transversal type as described in U.S. Pat. No. 4,288,872. Filter F1, performing a linear postcursor correction, works into a first nonlinear compensation cell including the series combination of a decision stage D1 and another filter F2 shunted by a delay line R1 which retards the output signal of filter F1 by a time 2T (assuming that components D1 and F2 jointly introduce a delay T); the outputs of delay line R1 and filter F2 are connected to an adder S1 emitting a first purged but undecided symbol f on a lead 2. A decision unit D3, connected to that lead, generates a first decided symbol f̂ on an output lead 4.

Filter F3 of branch FB has its output connected to one input of an adder S2 forming part of a second nonlinear compensation cell which includes a feedback loop with a decision stage D2 in cascade with a filter F4. Filters F2 and F4 are also advantageously of the transversal type, with as many taps as there are precursor and postcursor samples to be compensated. Cell S2, D2, F4 is followed by a delay line R2, also introducing a lag of 2T, whose output lead 3 carries a second purged but undecided symbol b; lead 3 is further connected to a decision unit D4 generating a second decided symbol $\hat{b}$ on an output lead 5. The four output leads 2,4 and 3,5 of equalizer branches FF and FB are connected to respective inputs of a logic network RL, described hereinafter with reference to FIG. 2, which emits the final output signal of the equalizer on an outgoing lead 6.

Figure 2:
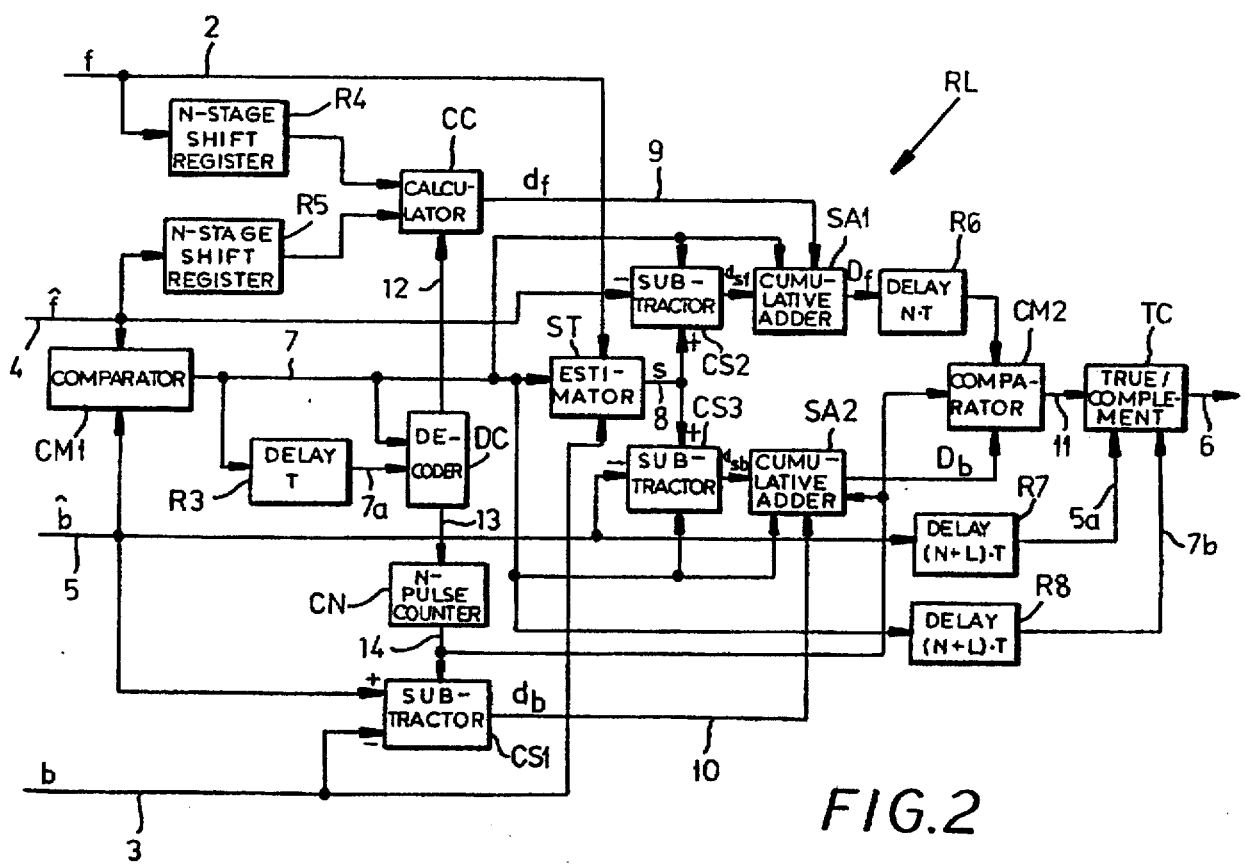
FIG. 2 shows details of a logic network forming part of the equalizer of FIG. 1.

As illustrated in FIG. 2, network RL comprises an input comparator CM1 with inputs respectively connected to leads 4 and 5 for receiving the decided symbols $\hat{f}$ and $\hat{b}$ from the feed-forward and feedback branches FF and FB shown in FIG. 1. An output lead 7 of comparator CM1 extends to an arithmetic unit ST, referred to hereinafter as an estimator, and in parallel therewith to a delay circuit R3 introducing a lag of one period T. A decoder DC has inputs respectively connected to lead 7 and to an output lead 7a of delay circuit R3. With lead 7 de-energized when comparator CM1 ascertains an equality between symbols $\hat{f}$ amd $\hat{b}$, decoder DC determines whether a divergence or disparity has been detected by the comparator and whether that disparity is the first or the last one in a sequence. Thus, only lead 7 will be energized in the first period of such a sequence whereas the exclusive energization of lead 7a indicates that the sequence has terminated.

When decoder DC finds high voltage on lead 7 and low voltage on lead 7a, it energizes an output lead 12 to activate a calculator CC associated with feed-forward branch FF. Calculator CC has two inputs respectively connected to leads 2 and 4 by way of a pair of delay circuits R4 and R5, advantageously designed as N-bit shift registers with serial inputs and parallel outputs, in which at the time of activation the symbols f and $\hat{f}$ received during the immediately preceding N recurrence periods T are stored. The value N, which may equal 1 in a limiting case, represents the number of previously received symbols whose postcursors are regarded as having affected the symbol $f_h$ present on lead 2 at a current instant h·T, i.e. whose intersymbol power exceeds the noise power of the system.

When enabled by the output signal of comparator CM1 on lead 7, unit ST emits on a lead 8 an estimated signal s given by $$s = a_1 \cdot f + a_2 \cdot b \qquad (1)$$

where $a_1$ and $a_2$ are two predetermined coefficients which are functions of inherent correlations or covariances between the purged signals f, b and the estimated signals s as well as between purged signals f or b on the same lead 2 or 4. Their magnitudes can be ascertained, e.g. with the aid of a test sequence, during a breaking-in period. These covariances are designated Rsf for signals s, f, Rsb for signals s, b, Rbf (or Rfb) for signals f, b, Rff for signals f alone and Rbb for signals b alone. Coefficients $a_1$ and $a_2$ can then be determined from the following equations:

$$Rsf = a_1 \cdot Rff + a_2 \cdot Rbf \qquad (2')$$

$$Rsb = a_2 \cdot Rfb + a_1 \cdot Rbb \qquad (2'')$$

In a sequence of symbols the covariance depends on the position of the considered symbol in that sequence so that estimator ST may assign different values to coefficients $a_1$ and $a_2$ for weighting the first pulse, one or more intermediate pulses and the last pulse in a succession of incorrectly decided symbols. More simply, however, an average coefficient $a_1$ and $a_2$ may be used for weighting the symbols f and b of an entire faulty series to produce the estimated signals s according to equation (1).

Calculator CC generates on an output lead 9 a first supplemental signal $d_f$ given by $$d_f = \sum_{i=h-N}^{h-1} |\hat{f}_i - f_i| \qquad (3)$$

which it delivers to a cumulative adder SA1. The latter also receives, from a subtractor CS2 with inputs tied to leads 4 and 8, a first difference signal $d_{sf}$ which, at a given instant x·T, has the form $$d_{sf}(x) = |s_x - \hat{f}_x| \qquad (4)$$

and thus represents the absolute value of the deviation of the symbol $\hat{f}_x$ then present on lead 4 from the concurrent estimate $s_x$ generated by unit ST. Adder SA1 combines this difference signal $d_{sf}$ for each period in which a disparity signal appears on lead 7, with the supplemental signal $d_f$ simultaneously appearing on lead 9 to produce a first discriminatory signal $D_f$. Supplemental signal $d_f$, as already noted, represents the contribution of the post-cursors of the immediately preceding N symbols to the erroneously decided symbol encountered at time h·T which may be the first in a sequence of such symbols having an assumed maximum length L and ending at a time k·T, with $(k-h) \leq L-1$. When only one symbol has been wrongfully decided, k=h.

Coefficients $a_1$ and $a_2$ are stored in the estimator ST.

Calculator CC is enabled, via lead 12, only in the first period h·T of a sequence of erroneous decisions, i.e. when decoder DC recognizes a situation $f_h \neq b_h$, $f_{h-1} = b_{h-1}$. Subtractor CS2 and adder SA1, however, remain active as long as lead 7 is energized, i.e. throughout the (k−h+1) recurrence periods T of the faulty sequence.

When decoder DC recognizes a situation $f_{k+1} = b_{k+1}$, $f_k \neq b_k$ in the period immediately following the end of that sequence, it energizes another output lead 13 extending to a second calculator, consisting of a self-resetting pulse counter CN and a subtractor CS1, associated with feedback branch FB of FIG. 1. Counter CN, on being thus triggered, is stepped by clock pulses from a nonillustrated time base—also controlling the other components of the equalizer—to count a number of recurrence periods T coinciding with as many subsequent pulse signals or symbols as are deemed to have precursors affecting the last erroneous decision at time k·T. In the present instance it is assumed that unit CN counts as many pulses, N, as are stored at one time in registers R4 and R5; thus, again, this counter might take only one step in a limiting case. Subtractor CS1, enabled by a signal on a lead 14 as long as the counter is active, has inputs tied to leads 3 and 5 in order to generate a second supplemental signal $d_b$ given by $$d_b(j) = |\hat{b}_j - b_j| \qquad (5)$$

with j ranging from k+1 through k+N. Signal $d_b$, as already noted, represents the contributions of the precursors of the immediately following N symbols to the symbol erroneously decided at time k·T.

A further subtractor CS3 has inputs connected to leads 5 and 8 in order to calculate, for each symbol of an erroneously decided sequence, a second difference signal $d_{sb}$ which, at a given instant x·T, has the form $$d_{sb}(x) = |s_x - b_x| \qquad (6)$$

and thus represents the absolute difference between the symbol $b_x$ then present on lead 5 and the concurrent estimate $s_x$ generated by unit ST. Subtractor CS3, deactivated upon the disappearance of the disparity signal on lead 7, loads the values of signal $d_{sb}$ into another cumulative adder SA2 which is activated concurrently with adder SA1 and is deactivated when counter CN returns to its zero position. Another input of adder SA2 is connected to an output lead 10 of subtractor CS1 to enable the calculation of a second discriminatory signal $D_b$ representing the sum of signals $d_{sb}$ and $d_b$; signal $D_b$ is fed to one input of an output comparator CM2 whose other input receives the first discriminatory signal $D_f$ from adder SA1 by way of a circuit R6 delaying same for N periods in order to compensate for the delayed generation of signal $D_b$. Comparator CM2 is activated at the end of the counting sequence by the signal on lead 14.

An output stage TC of network RL has a control input connected via a lead 11 to comparator CM2 and a data input tied to an extension 5a of lead 5 to which the decided signal b is transmitted by way of a delay circuit R7 retarding it by N+L recurrence periods T. The same lag is introduced by a delay circuit R8 inserted between lead 7 and an extension 7b thereof connected to another control input of stage TC which is of the true/complement type, designed to transfer to output lead 6 either the binary signal on lead 5a or its inversion. As long as signals f̂ and b̂ are identical, as indicated N+L periods later by the de-energization of lead 7b, the delayed but noninverted symbol b appears on lead 6 as the finally decided output signal of the equalizer. In the event of inequality, stage TC sends out the same noninverted symbol if the output signal of comparator CM2 shows $D_f \geq D_b$, i.e. determines that symbol f̂ supplemented by signal $d_f$ deviates from the estimated signal s by at least as much as symbol b supplemented by signal $d_b$. In the opposite case, namely with $D_f < D_b$, stage TC generates the complement of the delayed symbol b̂ then corresponding to the similarly delayed symbol f̂.

Since the described calculations cannot be carried out instantaneously, additional compensatory delays will have to be introduced by nonillustrated elements in the circuitry of network RL.

When the incoming pulse train on line 1 of FIG. 1 is of a bipolar nature, with positive and negative peaks respectively representing binary values +1 and −1, the resulting voltages on leads 2 and 3 will normally preserve that polarity but may vary widely in magnitude. Decision units D3 and D4 operate strictly in a binary mode, translating these voltages into signals with assigned values +1 or −1 depending on the polarities detected on leads 2 and 3, respectively.

It will thus be apparent that the decided symbol b generated by unit D4 is identical with the final output signal on lead 6, emitted with a delay (N+L)T, as long as there is no discrepancy between symbols f̂ and b̂. The delay enables the continuous emission of outgoing signals on lead 6 even while, upon detection of a disparity, network RL generates the various signals to be combined into discriminatory signals $D_f$ and $D_b$ fed to comparator CM2.

Output stage TC could be replaced by an electronic switch, still controlled by the signals on leads 7b and 11, which does not invert the signal on lead 5a but instead connects the output lead 6 to an extension of lead 4 in order to emit the symbol f̂—again with a delay of (N+L)T—in the event of a disparity with $D_f < D_b$.

The combination of components CS2 and SA1 may be defined as a first algebraic unit generating the discriminatory signal $D_f$ as the absolute value of the sum of supplemental signal $d_f$ and decided symbol f̂ diminished by the estimated signal s. Analogously, components CS3 and SA2 may be regarded as a second algebraic unit generating the discriminatory signal $D_b$ as the absolute value of the sum of supplemental signal $d_b$ and decided symbol b̂ diminished by the estimated signal s.

We claim:

1. In an equalizer for the correction of incoming digital pulse samples of predetermined recurrence period T, provided with a feed-forward branch and a feedback branch connected in parallel to a source of said pulse samples for respectively emitting a first signal f and a second signal b purged of precursor and postcursor interference, the combination therewith of:

first decision means connected to said feed-forward branch for deriving a first decided symbol f̂ from the first purged signal f in any recurrence period;

second decision means connected to said feedback branch for deriving a second decided symbol b̂ from the second purged signal b in any recurrence period;

an input comparator connected to said first and second decision means for detecting divergencies between said first and second decided symbols f̂, b̂;

first calculating means connected to receive the first purged signal f and the first decided symbol f̂, said first calculating means being controlled by said input comparator for generating a first supplemental signal $d_f$ representing the absolute difference between signal f and symbol f̂ for at least one recurrence period immediately preceding a period in which symbols f̂ and b̂ diverge from each other after having been identical during said preceding period;

second calculating means connected to receive the second purged signal b and the second decided symbol b̂, said second calculating means being controlled by said input comparator for generating a second supplemental signal $d_b$ representing the absolute difference between signal b and symbol b̂ for at least one subsequent recurrence period starting with a period in which symbols f̂ and b̂ are again identical after a previous divergence;

arithmetic means connected to receive purged signals f and b and controlled by said input comparator for computing therefrom an estimated signal s in response to a disparity signal indicating a divergence of symbols f̂ and b̂;

first algebraic means connected to said arithmetic means, to said first calculating means and to said first decision means for generating a first discriminatory signal $D_f$, representing the absolute value of the sum of said first supplemental signal $d_f$ and said first decided symbol f̂ diminished by said estimated signal s, in the presence of said disparity signal;

second algebraic means connected to said arithmetic means, to said second calculating means and to said second decision means for generating a second discriminatory signal $D_b$, representing the absolute value of the sum of said second supplemental signal $d_b$ and said second decided symbol $\hat{b}$ diminished by said estimated signal s, upon the disappearance of said disparity signal;

delay means connected to the output of said first algebraic means for delaying said first discriminatory signal $D_f$ by the time necessary for the generation of said second discriminatory signal $D_b$ by said second algebraic means;

an output comparator connected to said delay means and second algebraic means for concurrently receiving said delayed signal and second discriminatory signal $D_b$ therefrom and determining their relative magnitude; and an output stage connected to at least one of said decision means and controlled by said input and output comparators for emitting one of said decided symbols as an output signal in the event of an identity thereof and upon the corresponding discriminatory signal being smaller than the other, with emission of the complement of said one of said decided symbols in all other instances.

2. The combination defined in claim 1 wherein said arithmetic means computes said estimated signal s as the sum of said purged signals f and b multiplied by respective predetermined coefficients.

3. The combination defined in claim 1, further comprising additional delay means inserted in a connection between said input comparator and a control input of said output stage, carrying said disparity signal, and in a connection between said second decision means and a data input of said output stage, carrying said second decided symbol $\hat{b}$, for introducing a lag $(N+L)T$ where N is the number of consecutive recurrence periods during which said second supplemental signal $d_b$ is generated by said second calculating means, L being a maximum assumed length of consecutive recurrence periods in which a divergence between symbols $\hat{f}$ and $\hat{b}$ can be detected by said input comparator.

4. The combination defined in claim 1 wherein said first calculating means includes register means for storing signal f and symbol $\hat{f}$ for a predetermined number of preceding recurrence periods in which said first supplemental signal $d_f$ is to be generated, said second calculating means including a subtractor controlled by a counter of clock pulses establishing a predetermined number of consecutive subsequent recurrence periods in which said second supplemental signal $d_b$ is to be generated.

5. The combination defined in claim 4 wherein said preceding and subsequent recurrence periods have the same predetermined number N.

6. The combination defined in claim 5 wherein $N=1$.

7. The combination defined in claim 1 wherein said first and second algebraic means each comprises a subtractor followed by a cumulative adder.

8. In an equalizer for the correction of incoming digital pulse samples of predetermined recurrence period T, provided with a feed-forward branch and a feedback branch connected in parallel to a source of said pulse samples for respectively emitting a first signal f and a second signal b purged of precursor and postcursor interference, the combination therewith of:

first decision means connected to said feed-forward branch for deriving a first decided symbol $\hat{f}$ from the first purged signal f in any recurrence period;

second decision means connected to said feedback branch for deriving a second decided symbol $\hat{b}$ from the second purged signal b in any recurrence period;

an input comparator connected to said first and second decision means for detecting divergences between said first and second decided symbols $\hat{f}$, $\hat{b}$;

arithmetic means connected to receive purged signals f and b and controlled by an input generator for computing therefrom an estimated signal s in response to a disparity signal indicating a divergence of symbols $\hat{f}$ and $\hat{b}$;

first algebraic means connected to said arithmetic means and to said first decision means for generating a first discriminatory signal $D_f$, including the absolute value of the difference between said first decided symbol $\hat{f}$ and said estimated signal s, in the presence of said disparity signal;

second algebraic means connected to said arithmetic means and to said second decision means for generating a second discriminatory signal $D_b$, including the absolute value of the difference between said second decided symbol $\hat{b}$ and said estimated signal s, upon the disappearance of said disparity signal;

delay means connected to the output of said first algebraic means for delaying said first discriminatory signal $D_f$ by the time necessary for the generation of said second discriminatory signal $D_b$ by said second algebraic means;

an output comparator connected to said delay means and second algebraic means for concurrently receiving said delayed signal and second discriminatory signal $D_b$ therefrom and determining their relative magnitude; and an output stage connected to at least one of said decision means and controlled by said input and output comparators for emitting one of said decided symbols as an output signal in the event of an identity thereof and upon the corresponding discriminatory signal being smaller than the other, with emission of the complement of said one of said decided symbols in all other instances.

9. A method of operating an equalizer for the correction of incoming digital pulse samples of predetermined recurrence period T, the equalizer being provided with a feed-forward branch and a feedback branch connected in parallel to a source of said pulse samples for respectively emitting a first signal f and a second signal b purged of precursor and postcursor interference, comprising the steps of:

(a) respectively deriving from said first purged signal f and from said second purged signal b a first decided symbol $\hat{f}$ and a second decided symbol $\hat{b}$ each assuming either of two predetermined binary values;

(b) comparing said first and second decided symbols $\hat{f}$ and $\hat{b}$ with each other in every recurrence period T to detect a possible divergence;

(c) upon detection of an identity between said decided symbols $\hat{f}$ and $\hat{b}$ in any recurrence period, emitting one decided symbol as an output signal of the equalizer;

(d) upon detecting a divergence between said decided symbols $\hat{f}$ and $\hat{b}$ in any recurrence period, generating an estimated signal s by multiplying each of said purged signals f, b with a predetermined coefficient and linearly combining the resulting multiplication products;

(e) determining the absolute values of respective differences $d_{sf}$ and $d_{sb}$ between said decided symbols $\hat{f}$, $\hat{b}$ and said estimated signal s in the recurrence period T in which a divergence has been detected in step (d); and (f) selecting, on the basis of said absolute values of differences $d_{sf}$ and $d_{sb}$, one of said decided symbols $\hat{f}$, $\hat{b}$ for emission as an output signal of the equalizer.

10. The method defined in claim 9 wherein the selection of step (f) is based on a comparison of the relative magnitudes of a first discriminatory signal $D_f$ and a second discriminatory signal $D_b$, said first discriminatory signal $D_f$ being calculated as the sum of the absolute values of difference $d_{sf}$ and of the difference $\hat{f}-f$ between said first decided symbol and said first purged signal received in at least one recurrence period immediately preceding a period in which symbols $\hat{f}$ and $\hat{b}$ are found to diverge from each other after having been identical in the preceding period, said second discriminatory signal $D_b$ being calculated as the sum of the absolute values of difference $d_{sb}$ and of the difference $\hat{b}-b$ between said second decided symbol and said second purged signal received in at least one succeeding recurrence period starting with a period in which symbols $\hat{f}$ and $\hat{b}$ are again identical after a previous divergence, the emitted output signal being one of said decided symbols upon the corresponding discriminatory signal proving smaller than the other and being the complement of said one of said decided symbols in all other instances.

* * * * *